No. 625,687. Patented May 23, 1899.
T. E. KELLOGG.
VEHICLE WHEEL.
(Application filed Aug. 19, 1898.)

(No Model.) 2 Sheets—Sheet 1.

Witnesses
L. C. Hills.
H. L. Ames.

Inventor:
Thomas E. Kellogg,
by O. D. Stockbridge
his Attorney

No. 625,687. Patented May 23, 1899.
T. E. KELLOGG.
VEHICLE WHEEL.
(Application filed Aug. 19, 1898.)
(No Model.) 2 Sheets—Sheet 2.
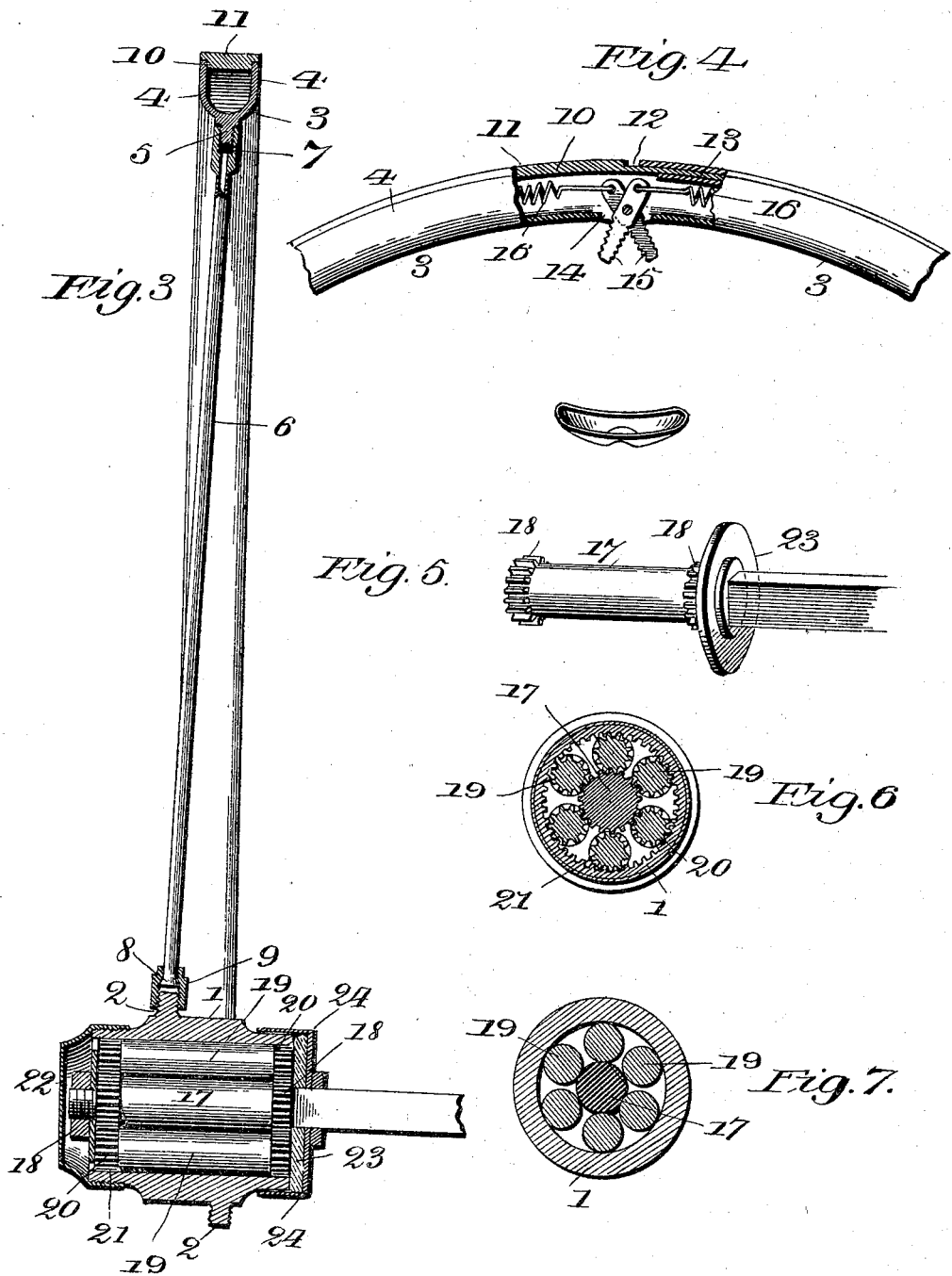
Witnesses
L. C. Hills
H. L. Amer
Inventor:
Thomas E. Kellogg,
by V. L. Shackelridge
his Attorney
THE NORRIS PETERS CO., PHOTO-LITHO., WASHINGTON, D. C.

UNITED STATES PATENT OFFICE.

THOMAS E. KELLOGG, OF WALLA WALLA, WASHINGTON, ASSIGNOR OF ONE-FOURTH TO HARRY A. REYNOLDS, OF SAME PLACE.

VEHICLE-WHEEL.

SPECIFICATION forming part of Letters Patent No. 625,687, dated May 23, 1899.

Application filed August 19, 1898. Serial No. 689,017. (No model.)

*To all whom it may concern:*

Be it known that I, THOMAS E. KELLOGG, a citizen of the United States, residing at Walla Walla, in the county of Walla Walla and State of Washington, have invented certain new and useful Improvements in Vehicle-Wheels; and I do hereby declare the following to be a full, clear, and exact description of the invention, such as will enable others skilled in the art to which it appertains to make and use the same.

My invention relates to vehicle-wheels, the object of the same being to provide means whereby the spokes may be readily removed and replaced and means whereby the tire will be held in place upon the felly.

The invention consists of a hub having threaded radially-projecting studs thereon, a felly having similar studs thereon, and spokes whose outer ends are internally threaded for receiving the studs on the felly and whose inner ends are provided with loosely-mounted sleeves provided with internal screw-threads adapted to receive the studs on the hub.

The invention also consists of a hollow felly, a tire having a longitudinal rib on the inner surface thereof adapted to fit within said felly, and means for drawing the meeting ends of said tire together, as hereinafter more fully described and claimed.

Figure 1:
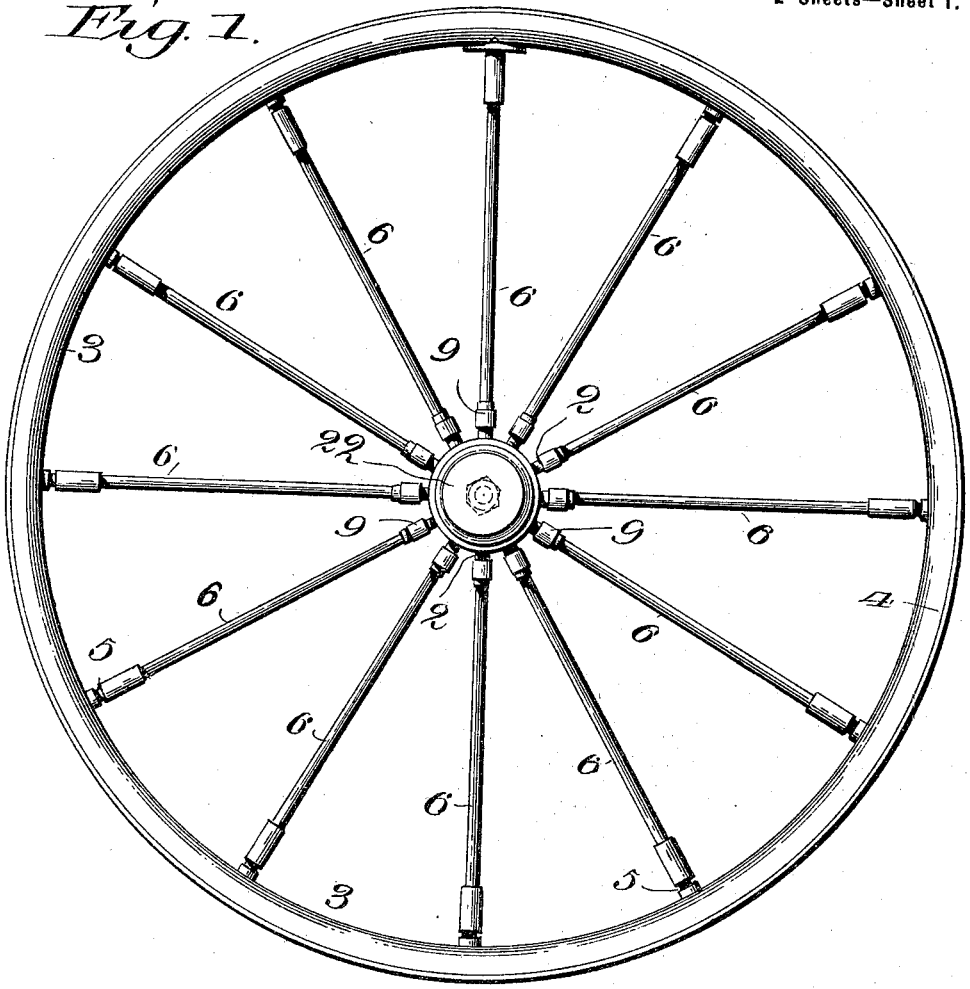
Figure 2:
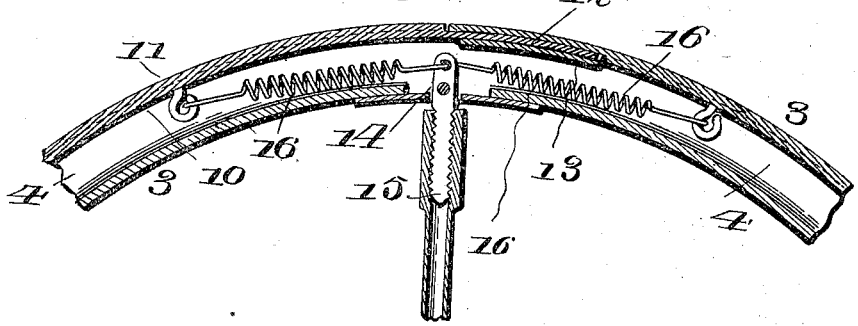

In the drawings forming part of this specification, Figure 1 represents a side elevation of a wheel constructed in accordance with my invention shown upon the end of the axle on which it is mounted. Fig. 2 is a vertical longitudinal section through a portion of the felly, showing the tire and the tightening device therefor. Fig. 3 is a sectional view through one of the spokes, the felly, and the hub. Fig. 4 is a side elevation of a portion of the wheel adjacent to the meeting ends of the tire with the felly partly broken away to show the spring connections between the ends of the tire and the levers for operating said springs. Fig. 5 is a detail perspective view of one end of the axle, showing the teeth thereon and the leather washer applied thereto. Fig. 6 is a cross-sectional view through the hub and axle, the same extending through the toothed ends of the rollers, the axle, and the boxing. Fig. 7 is a similar view through the same at a point intermediate of the toothed ends of the axle.

Like reference-numerals indicate like parts in the different views.

The hub 1 is provided with outwardly-extending screw-threaded studs 2 2 thereon, and the felly 3 is constructed of sheet metal, whose edges are bent outwardly, forming parallel sides 4 4. Projecting inwardly from the felly 3 are screw-threaded studs 5 5. The spokes 6 are preferably constructed of hollow tubing, having their outer ends internally screw-threaded, as shown at 7, so as to receive the studs 5 on the felly. The inner ends of said spokes are formed with heads or shoulders 8 and are provided with loosely-mounted internally-threaded sleeves 9 9, adapted to receive the studs 2 on the hub 1. The heads or shoulders 8 upon the inner ends of said spokes serve to prevent the accidental detachment of the sleeves 9 therefrom.

In applying spokes to the wheel the outer end thereof is placed upon one of the studs 5 and screwed in place. When the inner end of the spoke is free to pass upon the outer end of the opposing stud 2 on the hub, the sleeve 9 is screwed down upon the stud 2 and the spoke is held in place and the felly secured upon the hub. Of course the spokes may be tightened at any time by increasing the tension between the sleeves 9 and the studs 2, or they may be removed by reversing the operation just described.

The felly 3, being constructed of sheet metal and bent in the manner set forth, is U-shaped in cross-section, a channel being left between the sides 4 4 thereof. Within this channel fits a longitudinally-extending rib 10 upon the inner surface of the tire 11, which latter is constructed of sheet metal. The said rib prevents the lateral movement of the tire with respect to the felly in a manner readily understood. Upon one end of the tire 11 a tongue 12 is formed, which fits within a corresponding socket 13 in the opposite end. This means of connection provides for a close joint between the ends of the tire at their meeting-point. Extending through a slot 14 in the inner edge of the felly are two levers 15 15, which are fulcrumed upon a pin or screw extending transversely through said felly. The outer ends of said levers are provided with openings through which the ends of coiled springs 16 16 pass, the outer ends of said springs being connected, respectively, to the tire 11 on opposite sides of its meeting-point. By drawing the inner or projecting ends of said levers inwardly a tension is exerted upon said springs, which applied to the ends of the tire 11 serve to tighten the latter. The said levers are held in their inner alined positions by means of the engagement of one of the spokes 6, within which said levers are adapted to fit. The same are provided with external screw-threads and correspond in other respects with the studs 5 on the felly 3. By this construction it will be observed that the tire is held at all times in close contact with the felly and that accidental removal therefrom is effectually avoided. If it be desired at any time to remove the tire for repairs or renewal, it is merely necessary to remove the spoke 6 from the levers 15 and the pivot-pin from the latter.

The axle 17 is provided adjacent to its outer ends with two sets of cog-teeth 18 18, between which are located a series of antifriction-rollers 19 19, having reduced outer ends 20, provided with teeth 21, which mesh with the teeth 18 on the axle and with corresponding internal teeth on the boxing of the hub. By this construction an antifrictional bearing between the hub and the spindle is provided, and the rollers 19 are held spaced apart, so that they cannot come in contact one with the other, and thereby detract from the antifrictional properties thereof.

To prevent the entrance of dust to the bearings, I provide upon the outer end of the hub a cap 22, which is screwed to the point-band and covers the outer end of the spindle. Adjacent to the opposite end of the hub is secured upon the axle 17 a leather washer 23, which fits within the band on said hub and is held in place by means of a cap 24, which is provided with a central opening through which the axle passes and with an annular flange which embraces the hub and is screwed thereto.

Having now described the invention, what is claimed as new, and desired to be secured by Letters Patent, is—

1. A vehicle-wheel comprising a hub, a felly and spokes, the hub and felly having screw-threaded studs thereon, and the spokes being provided with a threaded socket at one end adapted to receive one of said studs and at the opposite end with a threaded sleeve adapted to receive the other of said studs.

2. A vehicle-wheel comprising a hub, a felly and spokes, the hub and felly having externally-screw-threaded studs thereon, and each of the spokes having a threaded socket in one end adapted to receive one of said studs, a shoulder upon the opposite end and a loosely-mounted internally-threaded sleeve held in place by said shoulder and adapted to receive the other of said studs.

3. In a vehicle-wheel, a felly having a channel therein, a tire surrounding said felly, springs adjacent to the meeting ends of said tire fitting within said channel, and means for increasing the tension of said springs and thereby tightening the tire and holding it in place.

4. In a vehicle-wheel, a felly having a channel therein, a tire surrounding said felly, springs attached to said tire upon opposite sides of its meeting-point and fitting within said channel, and a pair of pivoted levers to which the ends of said springs are respectively attached, as and for the purpose set forth.

5. In a vehicle-wheel, a felly having a channel therein, a tire surrounding said felly, a pair of levers extending through a slot in said felly and entering said channel, said levers being provided with external screw-threads, springs secured at their outer ends respectively to said tire upon opposite sides of its meeting-point and at their inner ends respectively to said levers, and a spoke having an internally-threaded socket for receiving the projecting ends of said levers, as and for the purpose set forth.

In testimony whereof I affix my signature in presence of two witnesses.

THOMAS E. KELLOGG.

Witnesses:
ALLEN H. REYNOLDS,
GEO. H. SUTHERLAND.